L. A. SINCLAIR.
Velocipede.
No. 91,679.
Patented June 22, 1869.
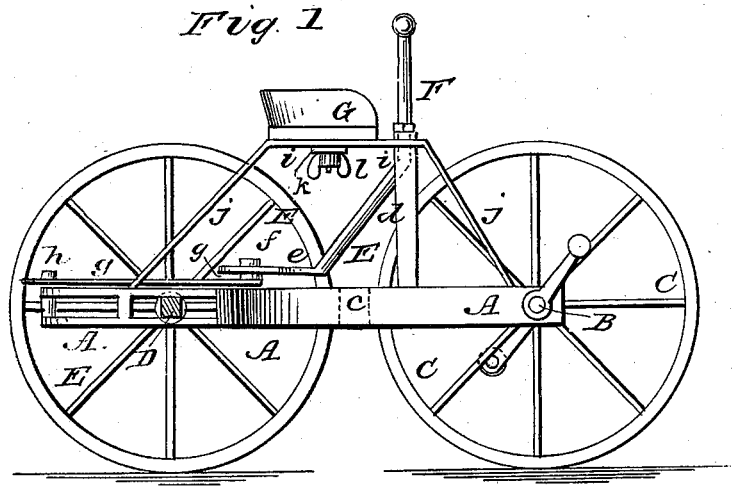
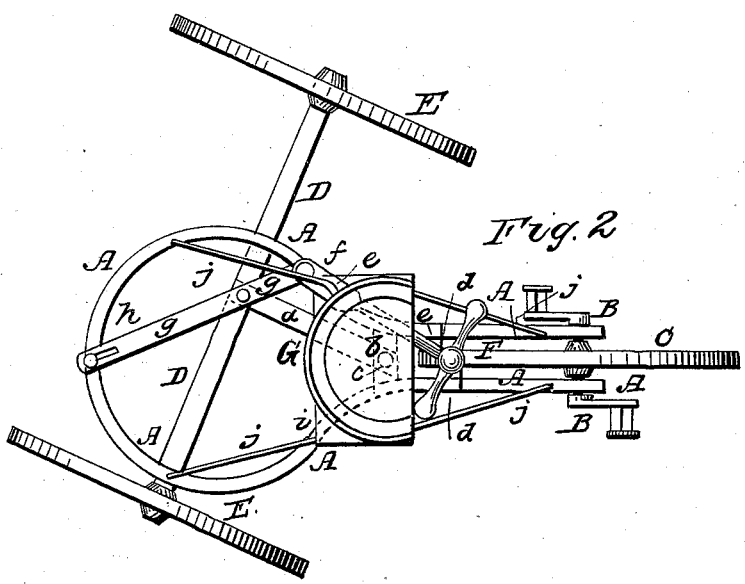

United States Patent Office.

LUCIUS A. SINCLAIR, OF BELLEVUE, OHIO.

Letters Patent No. 91,679, dated June 22, 1869.

IMPROVEMENT IN VELOCIPEDE.

The Schedule referred to in these Letters Patent and making part of the same.

*To all whom it may concern:*

Be it known that I, LUCIUS A. SINCLAIR, of Bellevue, in the county of Huron, and State of Ohio, have invented a new and improved Three-Wheeled Velocipede; and I do hereby declare that the following is a full, clear, and exact description thereof, which will enable others skilled in the art to make and use the same, reference being had to the accompanying drawing, forming part of this specification, in which—

Figure 1 represents a side elevation, partly in section, of my improved velocipede.

Figure 2 is a plan or top view of the same.

Similar letters of reference indicate corresponding parts.

This invention relates to a new steering-device for a three-wheeled velocipede.

The invention consists in arranging the rear axle in the slotted rear part of the frame, and in so connecting it, by a pivoted arm, with the front part of the frame, and by pointed levers, with a steering-handle in front, that it can, by turning the said handle, be bodily swung in the slots of the frame.

A, in the drawing, represents the frame of my improved velocipede. It is made in form of a bar, which has its ends brought parallel and near together in front, while its rear part is bulged out, to form the larger portion of a circle, as is clearly shown in fig. 2.

The parallel straight front ends of the lever or frame A carry the front crank-axle B of the front wheel C, while the rear axle D fits through slots that are formed in the back part of the frame, as in fig. 1.

The rear wheels E are mounted upon the ends of the axle D.

The middle of the axle D carries a forward projecting tongue, $a$, which is by a pin, $b$, pivoted to a cross-piece, $c$, of the frame, as shown, so that the rear axle can freely swing around its pivot $b$, and move in the slots of the frame.

F is the steering-post, held vertically in arms $d\ d$ that project from the frame, and provided with a projecting-arm, $e$, as shown.

This arm is by a pin, $f$, connected with a lever, $g$, that is pivoted to the middle of the axle D, as in fig. 2.

The rear end of the lever $g$ may be slotted, to be, by a pin, $h$, held to the centre line on the rear of the frame. The rear end of the arm E is also slotted. By turning the post F, the arm $e$ will be swung to carry the axle D around the pivot $b$, whereby the apparatus is readily steered.

The seat G is fastened upon horizontal bars $i\ i$, that are, by rods, $j$, supported on the frame A, and is, by a cross-bar, K, and screw, $l$, clamped to said bars $i$, more or less in front, as may be desired, it being thus longitudinally adjustable.

Having thus described my invention,

What I claim as new, and desire to secure by Letters Patent, is—

1. The rear axle D of a three-wheeled velocipede, when provided with a projecting tongue, $a$, which is in front pivoted by a pin, $b$, and when supported in the slotted frame A, substantially as herein shown and described.

2. The steering-post F, when connected by the jointed levers $e\ g$, with the pivoted rear axle D, to operate the same on the frame A, substantially as herein shown and described.

LUCIUS A. SINCLAIR.

Witnesses:
E. D. LORD,
B. P. SMITH.